United States Patent
Davis

(10) Patent No.: US 12,170,732 B2
(45) Date of Patent: *Dec. 17, 2024

(54) METHOD AND SYSTEM FOR VERIFICATION OF IDENTITY ATTRIBUTE INFORMATION

(71) Applicant: Mastercard International Incorporated, Purchase, NY (US)

(72) Inventor: Steven C. Davis, Saint Peters, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/242,901

(22) Filed: Sep. 6, 2023

(65) Prior Publication Data

US 2023/0421381 A1 Dec. 28, 2023

Related U.S. Application Data

(63) Continuation of application No. 17/060,363, filed on Oct. 1, 2020, now Pat. No. 11,831,782, which is a
(Continued)

(51) Int. Cl.
*H04L 9/32* (2006.01)
*G06Q 20/02* (2012.01)
(Continued)

(52) U.S. Cl.
CPC ........ *H04L 9/3242* (2013.01); *G06Q 20/02* (2013.01); *G06Q 20/06* (2013.01);
(Continued)

(58) Field of Classification Search
CPC ....... H04L 9/3242; H04L 9/0637; H04L 9/32; H04L 9/3265; H04L 63/0876;
(Continued)

(56) References Cited

U.S. PATENT DOCUMENTS 6,430,183 B1 8/2002 Satran et al.
8,726,009 B1* 5/2014 Cook .................. H04L 9/083
713/168

(Continued)

FOREIGN PATENT DOCUMENTS

CN 102957951 A 3/2013
CN 105164971 A 12/2015
(Continued)

OTHER PUBLICATIONS

Office Action (Third Office Action) issued Mar. 30, 2022, by the China National Intellectual Property Administration in corresponding Chinese Patent Application No. 201780041623.5 and an English Translation of the Office Action (13 pages).
(Continued)

*Primary Examiner* — Moeen Khan
(74) *Attorney, Agent, or Firm* — Panitch Schwarze Belisario & Nadel LLP

(57) ABSTRACT

A method for verification of a data value via a Merkle root includes: storing, in a memory of a processing server, a Merkle root; receiving at least a data value, a nonce, and a plurality of hash path values; generating a combined value by combining the data value and the nonce; generating a first hash value via application of a hashing algorithm to the combined value; generating a subsequent hash value via application of the hashing algorithm to a combination of the first hash value and a first of the plurality of hash path values; repeating generation of the subsequent hash value using a combination of the next hash path value of the plurality of hash path values and the most recent subsequent hash value; and verifying the data value based on a comparison of the Merkle root and the last generated subsequent hash value.

12 Claims, 6 Drawing Sheets

Related U.S. Application Data continuation of application No. 15/205,410, filed on Jul. 8, 2016, now Pat. No. 10,841,097.

(51) Int. Cl.

| | | |
|---|---|---|
| *G06Q 20/06* | (2012.01) | |
| *G06Q 20/38* | (2012.01) | |
| *H04L 9/00* | (2022.01) | |
| *H04L 9/06* | (2006.01) | |
| *H04L 9/40* | (2022.01) | |

(52) U.S. Cl.
CPC ....... *G06Q 20/3827* (2013.01); *H04L 9/0637* (2013.01); *H04L 9/32* (2013.01); *H04L 9/3265* (2013.01); *H04L 63/0876* (2013.01); *H04L 63/126* (2013.01); *G06Q 2220/00* (2013.01); *H04L 9/50* (2022.05)

(58) Field of Classification Search
CPC ......... H04L 63/126; H04L 9/50; G06Q 20/02; G06Q 20/06; G06Q 20/3827; G06Q 2220/00
USPC .......................................................... 713/170
See application file for complete search history.

(56) References Cited

U.S. PATENT DOCUMENTS

| | | | |
|---|---|---|---|
| 9,679,276 B1 | 6/2017 | Cuende | |
| 9,923,881 B2 | 3/2018 | Smith et al. | |
| 10,366,204 B2 * | 7/2019 | Tanner, Jr. | ............. G06Q 40/08 |
| 2005/0114666 A1 | 5/2005 | Sudia | |
| 2006/0036627 A1 | 2/2006 | Deran | |
| 2014/0245020 A1 | 8/2014 | Buldas et al. | |
| 2015/0006899 A1 * | 1/2015 | Seo | ....................... H04L 9/3252 |
| | | | 713/176 |
| 2016/0125040 A1 | 5/2016 | Kheterpal et al. | |
| 2016/0191243 A1 | 6/2016 | Manning | |
| 2017/0237570 A1 | 8/2017 | Vandervort | |
| 2017/0250815 A1 | 8/2017 | Cuende et al. | |
| 2017/0359374 A1 | 12/2017 | Smith et al. | |
| 2018/0006807 A1 | 1/2018 | Suresh et al. | |
| 2018/0006808 A1 | 1/2018 | Suresh et al. | |
| 2018/0025166 A1 | 1/2018 | Daniel et al. | |

FOREIGN PATENT DOCUMENTS

| | | |
|---|---|---|
| CN | 105228157 A | 1/2016 |
| CN | 105593872 A | 5/2016 |

OTHER PUBLICATIONS

Notification of Transmittal of the International Search Report and the Written Opinion of the International Searching Authority (Forms PCT/ISA/220, PCT/ISA/210 and PCT/ISA/237) issued on Oct. 9, 2017, by the European Patent Office in corresponding International Application No. PCT/US2017/036238 (13 pages).

Tree, ethereum/iki Wiki. GitHub, Feb. 4, 2016, XP055373909, Retrieved from Internet: URL: https://github.com/ethereum/wiki/wiki/Patricia-Tree/e4cc57e63810b7eda848fc299ffi8aff32933576 [retrieved on May 17, 2017] pp. 1-4.

Office Action (First Office Action) issued Feb. 26, 2021, by the China National Intellectual Property Administration in corresponding Chinese Patent Applicatino No. 201780041623.5 and an English Translation of the Office Action (15 pages).

Office Action (Fourth Office Action) issued Jun. 29, 2022, by the China National Intellectual Property Administration in corresponding Chinese Application No. 201780041623.5 and an English Translation of the Office Action (12 pages).

Office Action (Second Office Action) issued on Aug. 23, 2021, by the China National Intellectual Property Administration in corresponding Chinese Patent Application No. 201780041623.5 and an English Translation of the Office Action. (17 Pages).

* cited by examiner

METHOD AND SYSTEM FOR VERIFICATION OF IDENTITY ATTRIBUTE INFORMATION

FIELD

The present disclosure relates to the verification of identity attribute information, specifically the use of specifically configured salting and hashing techniques to enable the verification of identity attribute information while preventing the ability for the identity attribute information to be guessed.

BACKGROUND

In order to protect information, sensitive data, such as identify attribute information related to individuals, is often stored in manners that make retrieval or identification of the data difficult. For instance, the data may be encrypted such that only authorized entities that have access to the proper encryption key may decrypt the data. However, encryption typically requires the encryption key to be shared, which may sometimes be difficult and provides the opportunity for the key, and by extension the sensitive data, to be compromised. An alternative method that has been developed to protect data is hashing, where a hash value is generated from data that cannot be reversed, such that the underlying data value must be known to generate that specific hash value.

Hashing can be very effective for instances where underlying data values may have a large variance in their data, such as documents where every character and space changes the resulting hash value. If a Merkle tree is used, the effect is compounded as not only must the underlying data values be known, but the ordering of the data for generation of the Merkle tree must also be known. However, if the underlying data values are of a limited set, a nefarious entity may, with access to a sufficient computing system, be able to hash every possible data value as well as the potential orderings for a Merkle tree. For instance, if the underlying data values are birth dates for individuals, the possibilities are very limited, such that a powerful computing system may be able to identify every possible hash value and Merkle tree.

Thus, there is a need for a technical solution to enable the hashing and storage of identify attribute information and other data values for verification that prevents the ability for the underlying data values to be guessed.

SUMMARY

The present disclosure provides a description of systems and methods for the verification of data values via a Merkle root. A nonce is combined with the data value to protect the identification of the data value through guesswork of the data value and subsequent values in a Merkle tree. The underlying data value may thus be proven to an entity for verification thereof using the data value and the nonce that was combined prior to hashing and processing of the Merkle tree, enabling fast verification and proof of the underlying data, while protecting the data from being compromised even if the underlying data values are of a limited set.

A method for verification of a data value via a Merkle root includes: storing, in a memory of a processing server, a Merkle root; receiving, by a receiving device of the processing server, at least a data value, a nonce, and a plurality of hash path values; generating, by a generation module of the processing server, a combined value by combining the data value and the nonce; generating, by a hashing module of the processing server, a first hash value via application of a hashing algorithm to the combined value; generating, by the hashing module of the processing server, a subsequent hash value via application of the hashing algorithm to a combination of the first hash value and a first of the plurality of hash path values; repeating, by the hashing module of the processing server, generation of the subsequent hash value using a combination of the next hash path value of the plurality of hash path values and the most recent subsequent hash value; and verifying, by a verification module of the processing server, the data value based on a comparison of the Merkle root and the last generated subsequent hash value.

A system for verification of a data value via a Merkle root includes: a memory of a processing server configured to store a Merkle root; a receiving device of the processing server configured to receive at least a data value, a nonce, and a plurality of hash path values; a generation module of the processing server configured to generate a combined value by combining the data value and the nonce; a hashing module of the processing server configured to generate a first hash value via application of a hashing algorithm to the combined value, generate a subsequent hash value via application of the hashing algorithm to a combination of the first hash value and a first of the plurality of hash path values, and repeat the generation of the subsequent hash value using a combination of the next hash path value of the plurality of hash path values and the most recent subsequent hash value; and a verification module of the processing server configured to verify the data value based on a comparison of the Merkle root and the last generated subsequent hash value.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a permissionless, distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency. In some cases, participation in a blockchain (e.g., as a node submitting and/or confirming transactions) may be permissionless (e.g., not moderated or restricted). In other cases, a blockchain may be a permissioned blockchain where only authorized computing devices may operate as nodes, where a level of participation may be based on permissions associated therewith.

System for Data Value Verification Via a Merkle Root

Figure 1:
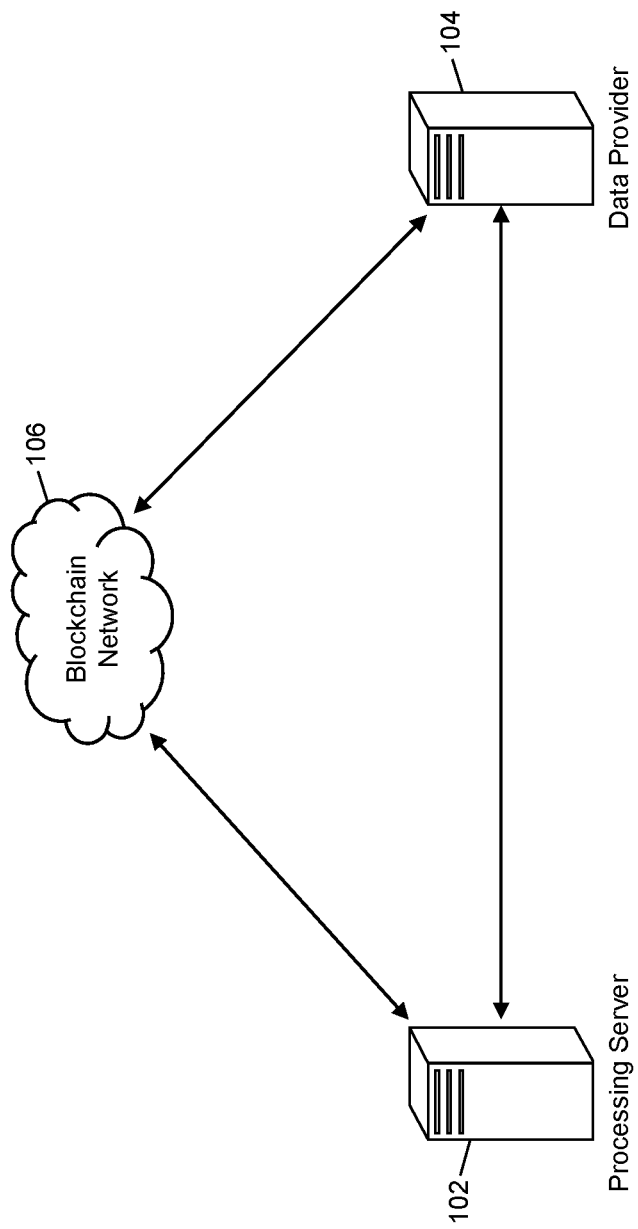
FIG. 1 is a block diagram illustrating a high level system architecture for the verification of data values using a Merkle root in accordance with exemplary embodiments.

FIG. 1 illustrates a system 100 for the verification of a data value via the use of a Merkle root, where the data value is combined with a nonce before inclusion in the Merkle tree for protection thereof.

The system 100 may include a processing server 102. The processing server 102, discussed in more detail below, may be configured to verify data values via the use of a Merkle tree. The system 100 may also include a data provider 104. The data provider 104 may be configured to provide a data value to the processing server 102 for verification thereof. In some instances, the data value may comprise identity attribute information, such as a birth date, name, address, telephone number, social security number, tax identification number, etc. In some cases, the data value may be of a limited set of data values, such as being included in a bounded set of integers or other similar values.

The data value to be verified by the processing server 102 may have been used in the generation of a Merkle tree that includes the data value as one of a plurality of data values used in the generation of the Merkle tree. Methods for generating a Merkle tree will be apparent to persons having skill in the relevant art. A Merkle tree may be generated by ordering each of the data values, hashing each of the data values using one or more predetermined hashing algorithms, hashing pairs of the resulting values, and continuing to hash the resulting pairs until a single hash value, referred to as the root of the Merkle tree or "Merkle root," is obtained. The use of hashing algorithms may ensure that the Merkle root for the plurality of data values is different if a single data value is changed. As a result, verification of a data value may be performed by ensuring that a Merkle root generated using the data value matches a previously identified Merkle root that had been generated using the value.

In the system 100, prior to generation of the Merkle tree, each of the data values may be combined with a nonce. The nonce may be a random or pseudo-random number or other value, such as a string of alphanumeric characters, that may be combined with the data value prior to generation of the Merkle tree. For instance, in one embodiment, the nonce may be a random 256-bit integer. The nonce may be added (e.g., via arithmetic addition) or otherwise combined (e.g., appended to the end of the data value) with the data value. The combined value may then be hashed as part of the generation of the Merkle tree. The use of the nonce may ensure that any nefarious entity attempting to guess at each of the data values and subsequent nodes in the Merkle tree may be unable to identify the data values as the hash values would be incorrect unless the data value is combined with the same nonce used in the generation of the Merkle tree. As a result, the data values may only be identified through guesswork if guessing of the nonce for each data value is successful. In such cases, the use of random numbers for the nonces, as well as the use of a longer nonce (e.g., 256 bits) may make the number of potential combinations too large to be solved by any existing computing system or systems. As a result, nonces may protect the data values from being identified via guesswork.

To verify a data value, the processing server 102 may receive the data value and its nonce from the data provider 104. For example, the data value may be a contract that the data provider 104 may want to prove (e.g., for authentication of the language included therein, digital signatures, etc.), where the data provider 104 may provide the processing server 102 with the contract and the nonce added thereto when a Merkle tree including the contract was generated. The processing server 102 may add the nonce to the contract and generate a Merkle tree. If the resulting Merkle root matches the Merkle root for the original Merkle tree, then the contract provided by the data provider 104 may be verified as the same contract used when the Merkle tree was generated.

Such verification processes may be beneficial in instances where the Merkle tree, or at least the Merkle root of a Merkle tree, for a plurality of data values is publicly accessible by the processing server 102 and other entities and computing systems. In one such embodiment, the Merkle root may be a part of a blockchain network 106. The blockchain network 106 may include a plurality of computing nodes that may be configured to generate and verify blocks that are added to a blockchain, where each block is comprised of at least a block header. The header for a block may include a Merkle root that is generated using all transaction values represented by that block. In some instances, the block may include the transaction values, or may include encrypted, hashed, or otherwise obscured or modified versions of the transaction values. The processing server 102 may use the methods discussed herein to verify a transaction value by matching a subsequently generated Merkle root to the Merkle root included in the block header. In such instances, the transaction value may thus authenticate a document, verify an account balance, prove that a transaction took place, etc.

In some embodiments, the processing server 102 may have access to an entire Merkle tree. In such embodiments, the data provider 104 may provide the processing server 102 with only the data value and the corresponding nonce. The processing server 102 may combine the data value and nonce and hash the result, then compare the result to the corresponding node in the Merkle tree. In some cases, the processing server 102 may also generate the Merkle root and compare the Merkle root to the root of the accessed Merkle tree.

In other embodiments, the processing server 102 may only have access to the Merkle root, such as in instances where the processing server 102 obtains the Merkle root from a blockchain network 106. In such embodiments, the data provider 104 may provide the processing server 102 with each of the value in the hash path of the Merkle tree. The hash path may refer to each of the hash values that comprise nodes in the Merkle tree that, when provided with the data value and its nonce, enable generation of the Merkle root without access to the other data values. In some instances, the hash path may include the minimum amount of hash values required, which may be the nth root of the number of data values used in generation of the Merkle root. Additional information regarding a hash path is provided below with respect to the Merkle tree illustrated in FIG. 4.

The processing server 102 may combine the data value and nonce and hash the combined value to obtain a first hash value. The processing server 102 may then combine that first hash value with the first hash path value provided by the data provider 104, and then hash the combined value. The processing server 102 may then combine that subsequent value with the next hash path value and hash the result, and may continue to do so until a single value is obtained. This single value corresponds to the Merkle root of the Merkle tree that includes the provided data value. The processing server 102 may then determine if that Merkle root matches the identified Merkle root (e.g., from the blockchain) to verify if the provided data value is the same data value used in generation of the original Merkle root.

The methods and systems discussed herein enable the processing server 102 to verify a data value given the data value, its corresponding nonce, and the hash path used to generate a Merkle root. The use of the nonce may ensure that data values used in generation of the Merkle root are unable to be guessed at even with a vast amount of computing power, while still enabling fast and convenient verification of data. The use of a hash path may also ensure that the data may be verified given access to only the Merkle root, without the processing server 102 having to obtain any other data values or hashes associated therewith, which may provide for verifications that maintain a higher level of data security. As a result, data security may be greatly increased without sacrificing speed or efficiency in data verification.

Processing Server

Figure 2:
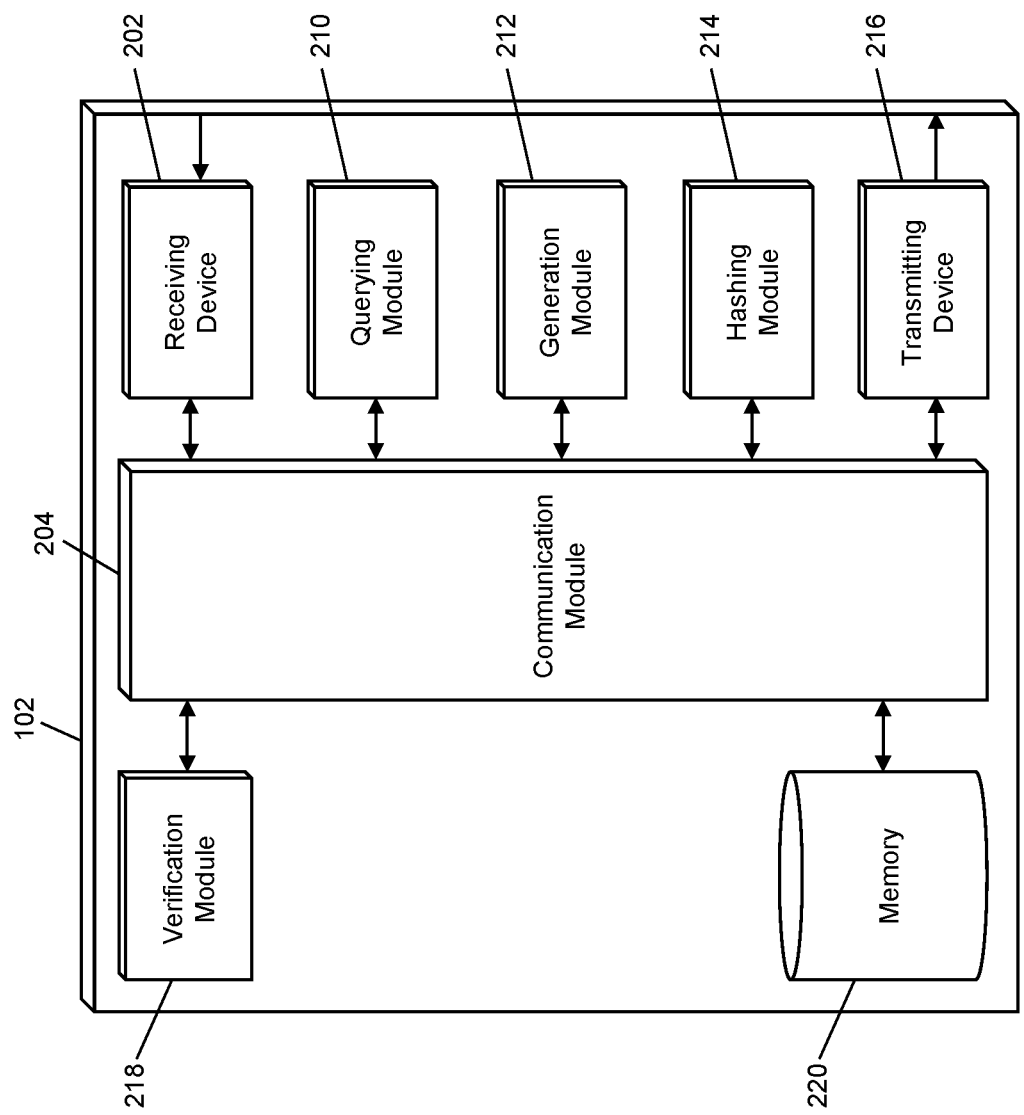
FIG. 2 is a block diagram illustrating the processing server of FIG. 1 for the verification of data values using Merkle roots in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing system 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. The receiving device 202 may be configured to receive data from computing devices 104 and other devices and systems via suitable communication networks and corresponding network protocols. In some embodiments, the receiving device 202 may be comprised of multiple devices, such as different receiving devices for receiving data over different networks, such as a first receiving device for receiving data over a local area network and a second receiving device for receiving data via a blockchain network. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by data providers 104, which may be superimposed or otherwise encoded with at least a data value and corresponding nonce. In some instances, the data signals may also be superimposed or encoded with a plurality of hash path values. The receiving device 202 may also be configured to receive data signals electronically transmitted by blockchain networks 106 or nodes associated therewith, which may be superimposed or otherwise encoded with a blockchain or data included therein, which may include Merkle roots, and, in some instances, may include additional data values included in a Merkle tree.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 210, generation module 212, hashing module 214, verification module 218, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include a querying module 210. The querying module 210 may be configured to execute queries on databases to identify information. The querying module 210 may receive one or more data values or query strings, and may execute a query string based thereon on an indicated database to identify information stored therein. The querying module 210 may then output the identified information to an appropriate engine or module of the processing server 102 as necessary. The querying module 210 may, for example, execute a query on a memory 220 of the processing server 102 to identify a Merkle root included in a blockchain for use in verification of a data value.

The processing server 102 may also include a generation module 212. The generation module 212 may be configured to generate data for use in performing the functions of the processing server 102 as discussed herein. The generation module 212 may receive a request, may generate data based on that request, and may output the generated data to another module or engine of the processing server 102. For instance, the generation module 212 may be configured to combine data values and nonces or to combine hash values with other hash values for use in the generation of Merkle trees for performing the functions of the processing server 102 discussed herein.

The processing server 102 may also include a hashing module 214. The hashing module 214 may be configured to generate hash values via the application of one or more hashing algorithms to data supplied to the hashing module 214. The hashing module 214 may receive data to be hashed as input, may apply one or more hashing algorithms to the data, and may output the generated hash value to another module or engine of the processing server 102. In some cases, the hashing module 214 may be supplied with the hashing algorithm(s) to be used in generation a hash value. In other cases, the hashing module 214 may identify the hashing algorithm(s) to be used, such as via the generation of queries for execution by the querying module 210 on the memory 220. The hashing module 214 may be configured, for example, to generate hash values for use in the generation of Merkle trees, such as by hashing combined data values and nonces or combined hash values, such as a combination of two hash values previously generated by the hashing module 214 as part of the generation of a Merkle tree.

The processing server 102 may also include a verification module 218. The verification module 218 may be configured to verify data as part of the functions of the processing server 102. The verification module 218 may receive data as input, may attempt to verify the data, and may output a result of the verification to another module or engine of the processing server 102. For example, the verification module 218 may be configured to verify if a generated Merkle root matches an identified Merkle root (e.g., from a blockchain) as verification of a provided data value. The verification module 218 may then output the result of the verification to another module or engine of the processing server 102, such as to a transmitting device 216 for reporting to the data provider 104.

The processing server 102 may also include the transmitting device 216. The transmitting device 216 may be configured to transmit data over one or more networks via one or more network protocols. The transmitting device 216 may be configured to transmit data to computing devices 106 and other entities via suitable communication networks and corresponding network protocols. In some embodiments, the transmitting device 216 may be comprised of multiple devices, such as different transmitting devices for transmitting data over different networks, such as a first transmitting device for transmitting data over a local area network and a second transmitting device for transmitting data via a blockchain network. The transmitting device 216 may electronically transmit data signals that have data superimposed that may be parsed by a receiving computing device. In some instances, the transmitting device 216 may include one or more modules for superimposing, encoding, or otherwise formatting data into data signals suitable for transmission.

The transmitting device 216 may be configured to electronically transmit data signals to data providers 104, such as may be superimposed or otherwise encoded with verification results, such as may be generated by the verification module 218 as a result of verification processes discussed herein. The transmitting device 216 may also be configured to electronically transmit data signals to data providers 104 that may be superimposed or otherwise encoded with data requests, such as for requesting data to be verified or requesting hash path values for use in generating a Merkle root. In some instances, the transmitting device 216 may also be configured to electronically transmit data signals to additional entities, such as nodes in the blockchain network 106, which may be superimposed or otherwise encoded with a request for a Merkle root, such as may be used to verify data provided by the data provider 104.

The processing server 102 may also include a memory 220. The memory 220 may be configured to store data for use by the processing server 102 in performing the functions discussed herein, such as a private key, key pair, formatting rules, a blockchain, etc. The memory 220 may be configured to store data using suitable data formatting methods and schema and may be any suitable type of memory, such as read-only memory, random access memory, etc. The memory 220 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 220 may be comprised of or may otherwise include a relational database that utilizes structured query language for the storage, identification, modifying, updating, accessing, etc. of structured data sets stored therein.

Process for Verification of a Data Value Via Hash Path Values

Figure 3:
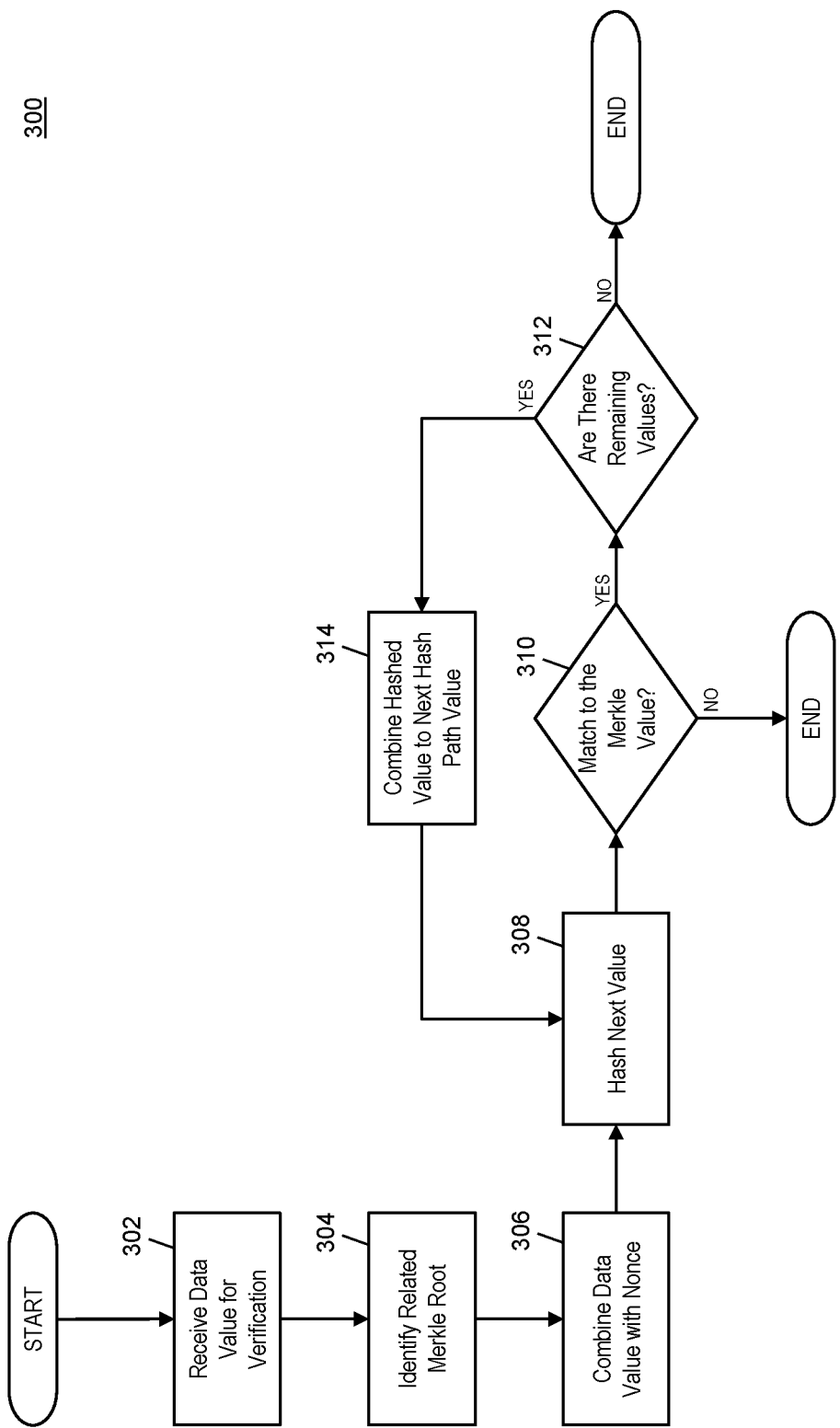
FIG. 3 is a flow diagram illustrating a process for the verification of a data value based on nodes in a Merkle tree using the processing server of FIG. 2 in accordance with exemplary embodiments.

FIG. 3 illustrates a process 300 for the verification of a data value based on a Merkle root, using hash path values provided by the data provider 104.

In step 302, the receiving device 202 of the processing server 102 may receive a data value for verification from the data provider 104. The data value may be accompanied by at least a nonce and a plurality of hash path values. In step 304, the processing server 102 may identify the Merkle root related to the data to be verified. In some instances, the identification may include the querying (e.g., by the querying module 210 of the processing server 102) of the memory 220 of the processing server 102 to identify the Merkle root, such as may be included in a blockchain. In other instances, the identification may include the transmission (e.g., by the transmitting device 216 of the processing server 102) of a data request to an associated entity, such as the blockchain network 106, and receipt (e.g., by the receiving device 202) of the Merkle root.

In step 306, the generation module 212 of the processing server 102 may generate a combined value by combining the data value to the corresponding nonce provided by the data provider 104. In some instances, the combination of the nonce to the data value may include mathematical addition of the nonce to the data value. In step 308, the hashing module 214 of the processing server 102 may hash the next value via application of one or more predetermined hashing algorithms thereto. In the first execution of step 308, the combined data value may be hashed.

In step 310, the verification module 218 of the processing server 102 may determine if the hash value generated by the hashing module 214 matches the corresponding value in the Merkle tree. In some instances, step 310 may be an optional step, such as in instances where the processing server 102 may not have access to the Merkle tree values (e.g., where only the Merkle root is accessible). If the generated hash value does not match the Merkle tree value, then the process 300 may be completed as the underlying data value provided by the data provider 104 may thus be incorrect. In some instances, the transmitting device 216 may transmit a data signal to the data provider 104 that is superimposed or otherwise encoded with an indication that the verification was unsuccessful.

If the hash value does match the corresponding Merkle tree value, or if such a verification is not able to be performed (e.g., due to lack of availability of Merkle tree values), then, in step 312, the processing server 102 may determine if there are additional hash path values remaining to use in generation of the Merkle root. The determination may be based on the data provided by the data provider 104, specifically the number of hash path values provided. If not all hash path values have been used, then the process 300 may proceed to step 314, where the generation module 212 may combine the hash value with the next hash path value. In some instances, the hash path values may be ordered in a specific order for use in generation of the combined values. The process 300 may then return to step 308, where this newly combined value is hashed and verified, as applicable.

The process 300 may continue to run until, in step 312, it is determined that every hash path value has been used, where the resulting hash value (e.g., generated in the latest execution of step 308) is determined to be the Merkle root. In such instances, the result of the verification performed in step 310 for the Merkle root may be the verification result for the provided data value. In some embodiments, the method 300 may also include the transmitting, by the transmitting device 216, of a notification to the data provider 104 indicating the result of the process 300, which may indicate the successful or unsuccessful verification of the data value based on the verification of the Merkle root generated therefrom.

Hash Path Values

Figure 4:
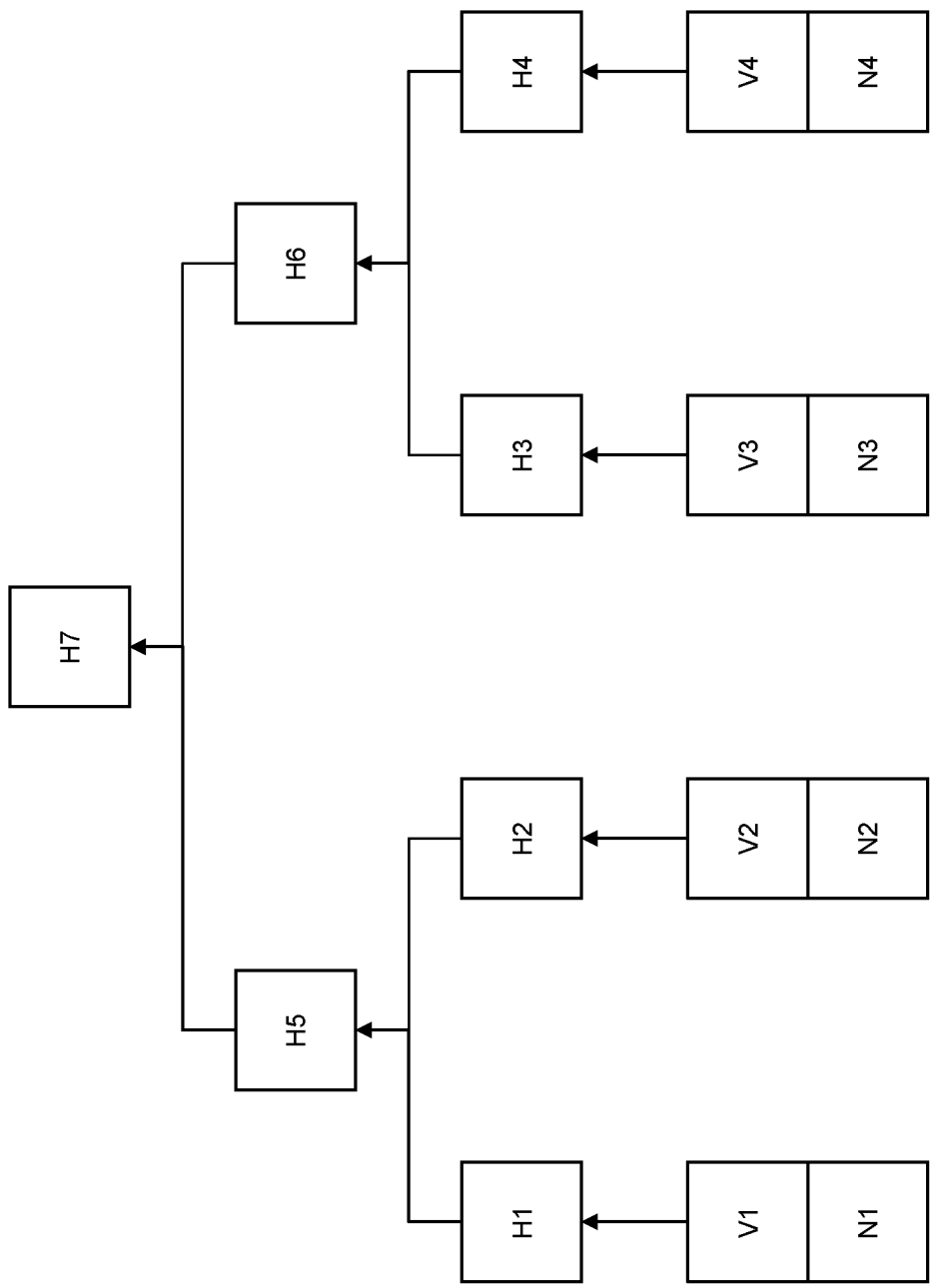
FIG. 4 is a diagram illustrating a Merkle tree for use in the verification of data values using the processing server of FIG. 2 in accordance with exemplary embodiments.

FIG. 4 illustrates a Merkle tree and corresponding values included therein, which may be used in the verification of data values using the methods and systems discussed herein. It will be apparent to persons having skill in the relevant art that the Merkle tree illustrated in FIG. 4 generated from four underlying data values, data values V1, V2, V3, and V4, is illustrative only, and that Merkle trees may be generated using any suitable number of values.

As illustrated in FIG. 4, the Merkle tree illustrated therein may be generated from four underlying values, V1-V4. Each underlying value may have a corresponding nonce, N1-N4. The values V1-V4 may be combined with the corresponding nonces N1-N4, respectively by the generation module 212 of the processing server 102. After being combined, the hashing module 214 of the processing server 102 may hash each of the combined values via application of one or more predetermined hashing algorithms thereto. The resulting values are hash values H1-H4, which may be considered values in the Merkle tree. The generation module 212 may then combine pairs of the values, H1 with H2 and H3 with H4, and the hashing module 214 may hash the combined values to generate the hash values H5 and H6, where H5 is a hash of the combination of H1 and H2, and where H6 is a hash of the combination of H3 and H4. The generation module 212 may combine H5 and H6 and the hashing module 214 may hash the combined value to generate the hash value H7.

The hash value H7, being a sole hash value in the Merkle tree with no other value to be combined with, may be considered to be the Merkle root for the tree. In the methods discussed herein, the processing server 102 may compare the hash value H7 with a Merkle root previously identified (e.g., from a blockchain or other third party data source) to verify a data value provided by the data provider 104.

In some embodiments, the processing server 102 may be configured to generate the Merkle root H7 without access to all of the underlying data values V1-V4 and corresponding nonces N1-N4. In such embodiments, the data provider 104 may provide the processing server 102 with a specific data value, such as data value V3, and its corresponding nonce, N3 in such an example, as well as each of the hash path values necessary for the processing server 102 to generate the Merkle root H7. The necessary hash path values may be the hash values in the Merkle tree that are combined with values generated by the hashing module 214 of the processing server 102 that are necessary to generate the Merkle root H7.

For instance, if the data provider 104 provides the value V3 and its corresponding nonce N3, then the hash path values would be hash values H4 and H5. In such an example, the hashing module 214 may be able to generate H3 from the combination of V3 and N3, generate H6 from H3 and the provided H4, and generate H7 from H6 and the provided H5. Thus, H4 and H5 are hash path values if V3 is to be verified. In another example, if V1 is to be verified, the hash path values would be H2 and H6. In such instances, the processing server 102 may be able to generate the Merkle root H7 without access to any of the additional underlying values, thereby protecting the values while still enabling the processing server 102 to verify the provided data value.

Exemplary Method for Verification of a Data Value Via a Merkle Root

Figure 5:
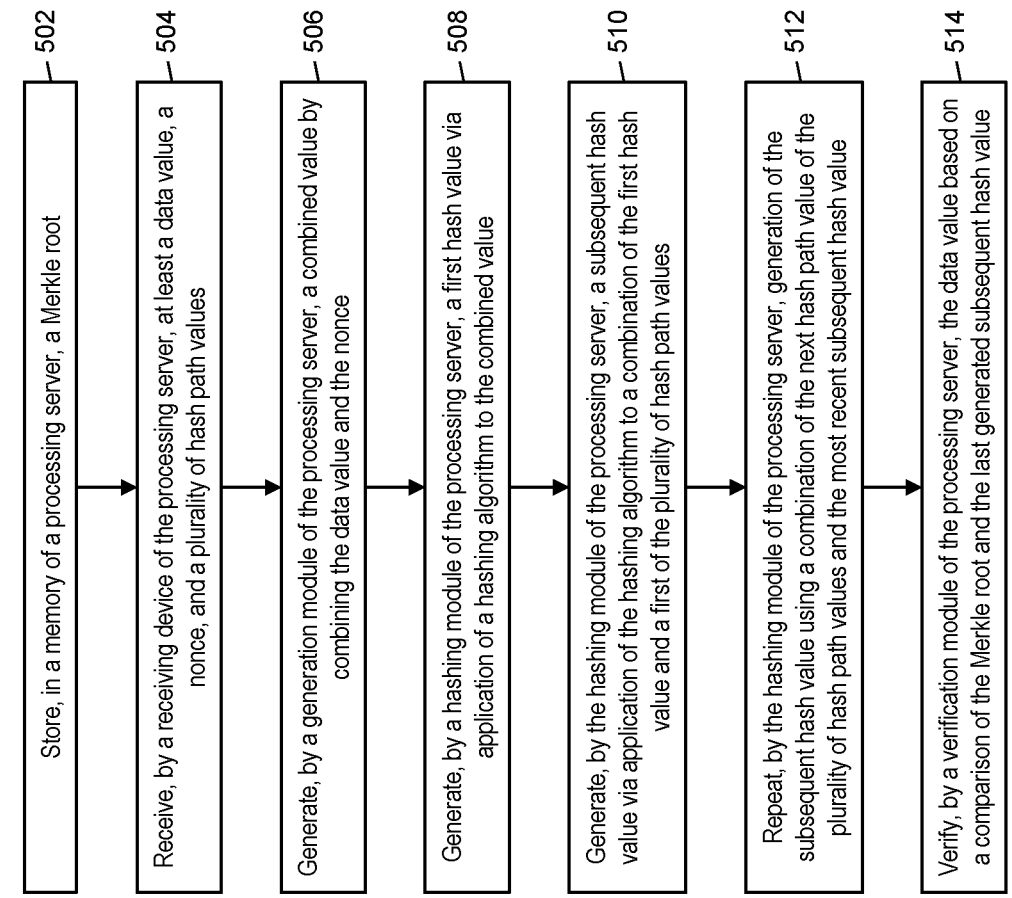
FIG. 5 is a flow chart illustrating an exemplary method for verifying a data value via a Merkle root in accordance with exemplary embodiments.

FIG. 5 illustrates a method 500 for the verification of a data value via the use of a Merkle root and hash path values.

In step 502, a Merkle root may be stored in a memory (e.g., the memory 220) of a processing server (e.g., the processing server 102). In step 504, at least a data value, a nonce, and a plurality of hash path values may be received by a receiving device (e.g., the receiving device 202) of the processing server. In step 506, a combined value may be generated by a generation module (e.g., the generation module 212) of the processing server by combining the data value and the nonce. In step 508, a first hash value may be generated by a hashing module (e.g., the hashing module 214) of the processing server via application of a hashing algorithm to the combined value.

In step 510, a subsequent hash value may be generated by the hashing module of the processing server via application of the hashing algorithm to a combination of the first hash value and a first of the plurality of hash path values. In step 512, the generation of the subsequent hash value may be repeated by the hashing module of the processing server using a combination of the next hash path value of the plurality of hash path values and a most recent subsequent hash value. In step 514, the data value may be verified by a verification module (e.g., the verification module 218) of the processing server based on a comparison of the Merkle root and the last generated subsequent hash value.

In one embodiment, the plurality of hash path values may have a specified order. In a further embodiment, the next hash path value of the plurality of hash path values may be identified based on the specified order. In some embodiments, the nonce may be a 256-bit random or pseudo-random number. In one embodiment, the data value and the nonce may be integers, and the combined value may be generated by adding the nonce to the data value.

In some embodiments, the method 500 may further include receiving, by the receiving device of the processing server, a blockchain, wherein the blockchain is comprised of a plurality of blocks, each block being comprised of a block header and one or more data values, wherein the Merkle root is included in the block header of one of the plurality of blocks. In a further embodiment, the method 500 may even further include executing, by a querying module (e.g., the querying module 210) of the processing server, a query on the blockchain to identify the one of the plurality of blocks. In an even further embodiment, receiving the data value, nonce, and plurality of hash path values may further include receiving a block identifier, and the block identifier may be included in the block header of the one of the plurality of blocks.

Computer System Architecture

Figure 6:
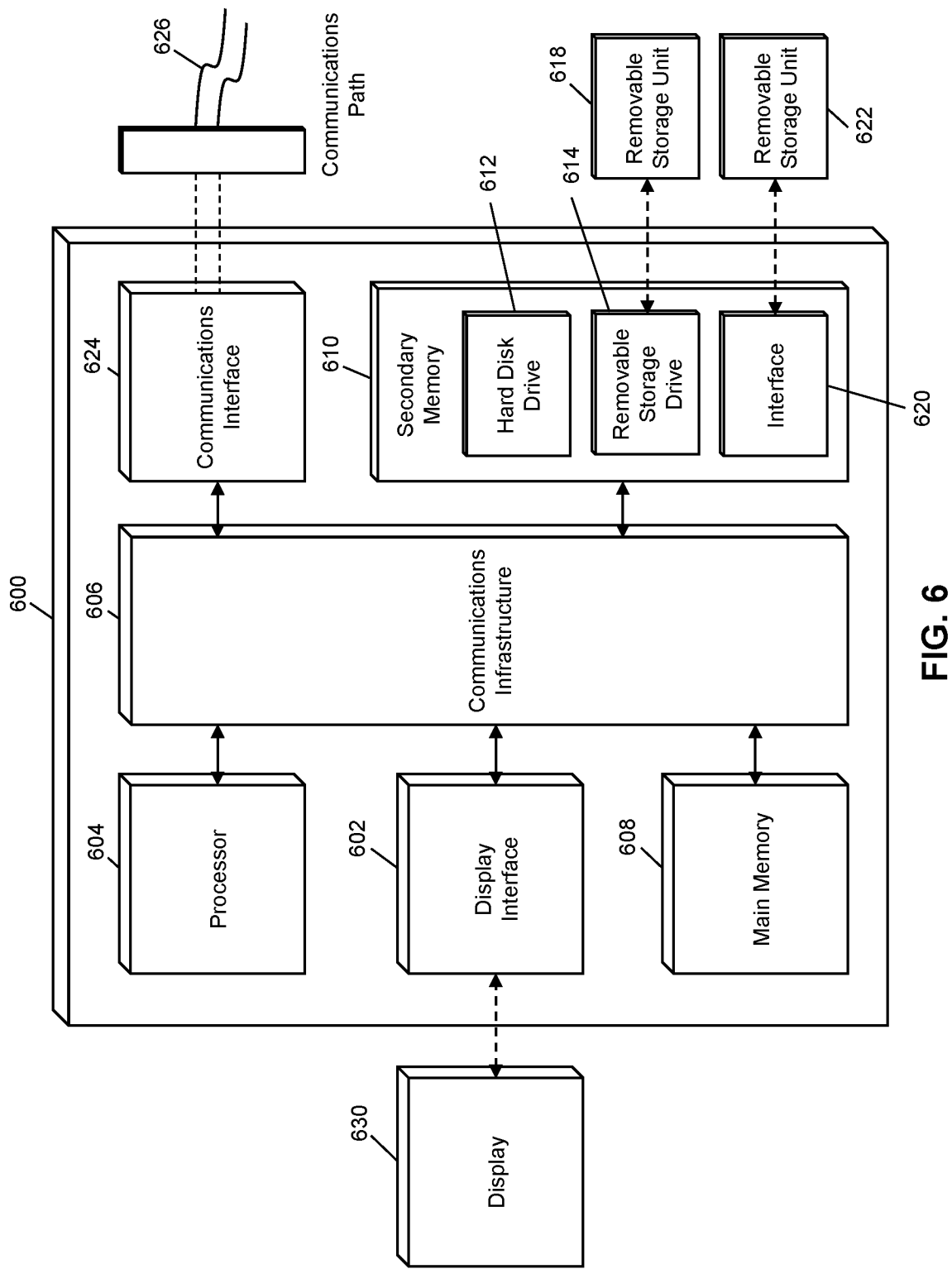
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3 and 4, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for verification of data values via a Merkle root. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for verification of a data value, comprising:
receiving, by a receiving device of a processing server, a blockchain, wherein the blockchain is comprised of a plurality of blocks, each block being comprised of a block header and one or more data values;
executing, by a querying module executed by a processor of the processing server, a query on the blockchain to identify a Merkle root included in the block header of a respective block of the plurality of blocks of the blockchain;
generating, by a generation module executed by the processor of the processing server, a combined value by combining the data value and a nonce;
generating, by a hashing module executed by the processor of the processing server, a first hash value of the combined value via application of a hashing algorithm;
generating, by the hashing module executed by the processor of the processing server, a subsequent hash via application of the hashing algorithm to a combination of a first hash path value and the first hash value;
repeating, by the hashing module executed by the processor of the processing server, generation of the subsequent hash value using a combination of a next hash path value and a most recent subsequent hash value until a last hash value is obtained, wherein the last hash value is a Merkle root of the data value; and
verifying, by a verification module executed by the processor of the processing server, that the Merkle root of the data value matches the identified Merkle root included in the block header of the respective block of the plurality of blocks of the blockchain.

2. The method of claim 1, wherein the first hash path value and the next hash path value are included in a plurality of hash path values, and said plurality of hash path values has a specified order.

3. The method of claim 2, wherein the next hash path value of the plurality of hash path values is identified based on the specified order.

4. The method of claim 1, wherein the nonce is a 256 bit random or pseudo-random number.

5. The method of claim 1, wherein
the data value and the nonce are integers, and
the combined value is generated by adding the nonce to the data value.

6. The method of claim 1, further comprising:
receiving a block identifier, which is included in the block header of the respective block of the plurality of blocks.

7. A system for verification of a data value, comprising:
a receiving device of the processing server configured to receive a blockchain, wherein the blockchain is comprised of a plurality of blocks, each block being comprised of a block header and one or more data values;
a querying module executed by a hardware processor of the processing server configured to execute a query on the blockchain to identify a Merkle root included in the header of a respective block of the plurality of blocks of the blockchain to verify the data value;

a generation module executed by the hardware processor of the processing server configured to generate a combined value by combining the data value and a nonce;

a hashing module executed by the hardware processor of the processing server configured to
- generate a first hash value of the combined value via application of a hashing algorithm,
- generate a subsequent hash value via application of the hashing algorithm to a combination of a first hash path value and the first hash value, and
- repeat the generation of the subsequent hash value using a combination of a next hash path value and the most recent subsequent hash value until a last hash value is obtained, wherein the last hash value is a Merkle root of the data value; and a verification module executed by the hardware processor of the processing server configured to verify that the Merkle root of the data value matches the identified Merkle root included in the block header of the respective block of the plurality of blocks of the blockchain.

8. The system of claim 7, wherein the first hash path value and the next hash path value are included in a plurality of hash path values, and said plurality of hash path values has a specified order.

9. The system of claim 8, wherein the next hash path value of the plurality of hash path values is identified based on the specified order.

10. The system of claim 7, wherein the nonce is a 256 bit random or pseudo-random number.

11. The system of claim 7, wherein
the data value and the nonce are integers, and
the combined value is generated by adding the nonce to the data value.

12. The system of claim 7, wherein the receiving device is further configured to receive a block identifier, which is included in the block header of the respective block of the plurality of blocks.

* * * * *